G. SMALL.
Feed Cutter.
No. 69,133. Patented Sept. 24, 1867.
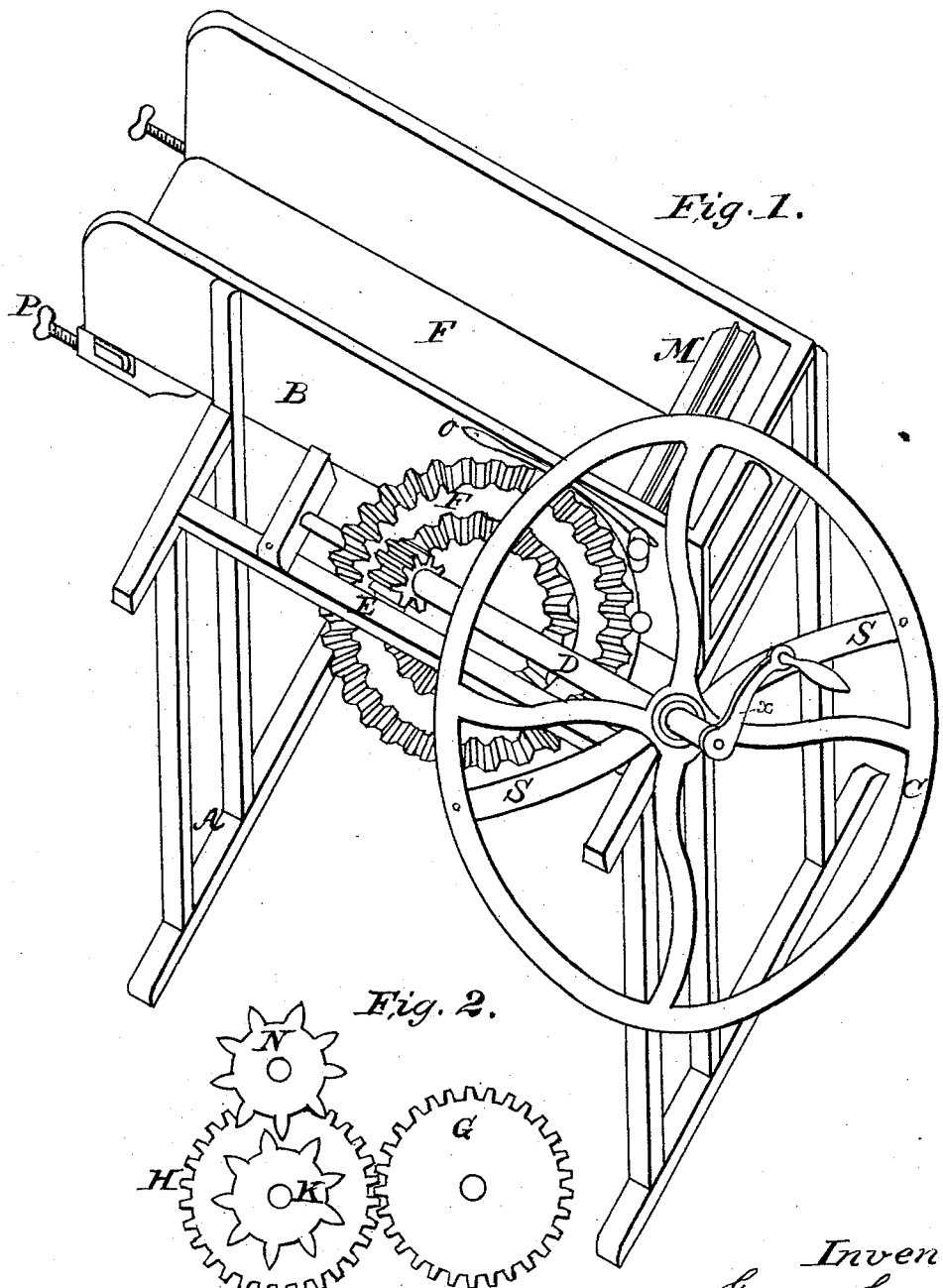

United States Patent Office.

GEORGE SMALL, OF CLAYTON, MICHIGAN, ASSIGNOR TO HARVEY WILLIAMS, OF OTSEGO, NEW YORK.

Letters Patent No. 69,133, dated September 24, 1867

IMPROVEMENT IN FEED-CUTTERS.

The Schedule referred to in these Letters Patent and making part of the same.

TO ALL WHOM IT MAY CONCERN:

Be it known that I, GEORGE SMALL, of Clayton, in the county of Lenawee, and State of Michigan, have invented a new and improved machine for cutting feed for horses and cattle, which I call a Self-Feeding Straw-Cutter; and I do hereby declare that the following is a full, clear, and exact description of the construction and operation of the same, reference being had to the annexed drawings, making a part of this specification, in which—

Figure 1 is a perspective view.

Figure 2 is a plan view of the gear that operates the feed motion of the machine, which is not shown in the perspective view.

A is the frame, and B is the box, which are made of wood. C is the balance or fly-wheel. D is the shaft, on which said wheel is placed, and by which the machine is operated. E is a small bevel-gear on shaft D. F is also a bevel-gear on a transverse shaft, which operates the feed motion. Said wheel has two rows of cogs on it, one being nearer and the other further from the centre. The wheel E is movable on the shaft, so that it can be placed in either of the rows of cogs on the wheel F, and, when meshed in the row farthest from the centre, the feed motion is slower, and therefore cuts shorter; but when placed in the row of cogs nearest the centre, it cuts longer. Wheel F may be constructed with three or four rows of cogs on it, if desired. G, fig. 2, is a gear-wheel on the opposite end of the same shaft as wheel F. It meshes into and operates wheel H, which is on the roller-shaft, around and by which the apron J is operated. Said apron carries the straw forward to the knives. K is another gear-wheel on the same end of the same shaft as wheel H. M is a roller. It may be made of wood or iron, or of both combined. It is constructed with ribs or flanges raised above its surface, which draws the straw forward as it turns, and also prevents the feed from being drawn forward by the action of cutting any faster than said roller revolves, thereby making it cut the feed of an equal length. N is a gear-wheel on the same shaft as roller M. It meshes into wheel K. O represents a spring, there being one on each side of the box B to press down the roller M, the journals of which run in a slot, which permits said roller to rise and fall, according to the amount of feed put into it, and the wheels N and K have long cogs, so that the roller can rise without putting said wheels out of gear. P P are screws connected with the roller on which the apron revolves at the back end of the box B, for the purpose of tightening said apron. S S are the knives, which are secured on the wheel C. X is a crank, by which the machine is turned when operated by man; but a driving-pulley can be put on the shaft, so that it can be operated by horse, water, or steam-power.

What I claim as my invention, and desire to secure by Letters Patent, is—

The combination of the several parts comprising this machine, when arranged as described and set forth, for the purpose specified.

GEORGE SMALL.

Witnesses:
　HENRY SMALL,
　EDWIN SMALL.